(12) United States Patent
Brunet et al.

(10) Patent No.: US 8,756,162 B2
(45) Date of Patent: Jun. 17, 2014

(54) METHOD FOR CARRYING OUT AN ELECTRONIC TRANSACTION

(75) Inventors: Ulrich Brunet, München (DE); Markus Mühlbauer, Gilching (DE); Stefan Rascher, Heroldsbach (DE)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 10/572,345

(22) PCT Filed: Sep. 20, 2004

(86) PCT No.: PCT/EP2004/010545
§ 371 (c)(1),
(2), (4) Date: Mar. 23, 2007

(87) PCT Pub. No.: WO2005/031667
PCT Pub. Date: Apr. 7, 2005

(65) Prior Publication Data
US 2007/0271192 A1    Nov. 22, 2007

(30) Foreign Application Priority Data
Sep. 19, 2003   (DE) .................. 103 43 566

(51) Int. Cl.
*G06Q 20/00* (2012.01)

(52) U.S. Cl.
USPC ............................................ 705/75; 705/24

(58) Field of Classification Search
USPC ...................................... 705/64, 75
See application file for complete search history.

(56) References Cited

U.S. PATENT DOCUMENTS

| | | | |
|---|---|---|---|
| 6,078,908 A | 6/2000 | Schmitz | |
| 6,144,847 A * | 11/2000 | Altschul et al. | 455/407 |
| 6,185,545 B1 * | 2/2001 | Resnick et al. | 705/40 |
| 6,236,851 B1 * | 5/2001 | Fougnies et al. | 455/408 |
| 6,269,155 B1 * | 7/2001 | Dennert | 379/114.05 |
| 6,301,348 B1 * | 10/2001 | Romo et al. | 379/207.12 |
| 6,782,080 B2 * | 8/2004 | Leivo et al. | 379/93.04 |
| 7,089,208 B1 * | 8/2006 | Levchin et al. | 705/39 |
| 7,209,890 B1 * | 4/2007 | Peon et al. | 705/17 |
| 7,328,844 B2 * | 2/2008 | Workens | 235/451 |
| 7,461,010 B2 * | 12/2008 | Kwan | 705/16 |
| 7,539,629 B1 * | 5/2009 | Peon et al. | 705/26.35 |
| 8,086,530 B2 * | 12/2011 | Resnick et al. | 705/39 |
| 8,346,659 B1 * | 1/2013 | Mohsenzadeh | 705/39 |
| 2001/0001321 A1 * | 5/2001 | Resnick et al. | 705/17 |
| 2001/0037264 A1 | 11/2001 | Husemann et al. | |
| 2002/0147658 A1 | 10/2002 | Kwan | |
| 2002/0165830 A1 | 11/2002 | Kremer | |
| 2003/0097342 A1 * | 5/2003 | Whittingtom | 705/75 |
| 2003/0110137 A1 * | 6/2003 | Armingaud et al. | 705/64 |
| 2003/0125011 A1 * | 7/2003 | Campbell | 455/406 |
| 2003/0130938 A1 | 7/2003 | Wolfston, Jr. | |
| 2003/0153298 A1 | 8/2003 | Eder et al. | |
| 2003/0200179 A1 * | 10/2003 | Kwan | 705/65 |
| 2004/0039651 A1 * | 2/2004 | Grunzig et al. | 705/26 |
| 2004/0064406 A1 * | 4/2004 | Yates et al. | 705/40 |
| 2004/0230536 A1 * | 11/2004 | Fung et al. | 705/64 |

FOREIGN PATENT DOCUMENTS

| | | |
|---|---|---|
| DE | 100 45 924 A1 | 4/2002 |
| DE | 101 25 017 A1 | 12/2002 |
| EP | 0 875 871 A2 | 11/1998 |
| EP | 1 065 634 A1 | 1/2001 |
| EP | 1 081 919 A1 | 3/2001 |
| JP | 2001/351033 | 12/2001 |
| JP | 2001/357328 | 12/2001 |
| JP | 2001/357339 | 12/2001 |
| JP | 2002/288484 | 10/2002 |
| JP | 2002/373296 | 12/2002 |
| JP | 2003/504739 | 1/2003 |
| JP | 2003/099687 | 4/2003 |
| WO | WO 01/86539 A1 | 11/2001 |
| WO | WO 02/23303 A2 | 3/2002 |
| WO | WO 03/071461 A1 | 8/2003 |

OTHER PUBLICATIONS

Korean Office Action issued in Korean Application No. 10-2006-7007114, dated May 17, 2011, pp. 1-5.
Japanese Office Action issued in Japanese Application No. 2006-526607, dated Jan. 28, 2010 pp. 1-10.
Japanese Office Action issued in Japanese Application No. 2006-526607, dated Sep. 10, 2010 pp. 1-10.

* cited by examiner

*Primary Examiner* — Calvin L Hewitt, II
*Assistant Examiner* — Nancy Loan Le
(74) *Attorney, Agent, or Firm* — Johnson, Marcou & Isaacs, LLC

(57) ABSTRACT

The invention relates to a method for carrying out an electronic transaction according to the following steps: Data exchange between a first network subscriber node (1) and a second network subscriber node (2) is carried out by a first terminal (1a) of the first network subscriber node (1) via a first communication network in order to determine transaction data of the transaction; an identification number of a second end device (1b) of the first network subscriber node (1) is inputted into a second communication network, which is different from the first, by means of a first network subscriber node (1) in the first terminal (1a) of the first network subscriber node (1); the identification number and the transaction data from first network subscriber nodes (1) are transmitted (S1, S2; S1') to a third network subscriber node (3) by means of a third communication network; the validity of the identification number is verified (S3) by the third network subscriber nodes (3) and an associated service provider node (4c) identifies a plurality of service provider nodes (4a, 4b, 4c, 4d) registered by the third network subscriber nodes (3); the verified identification number and the transaction data of the third network subscriber nodes (3) are transmitted to the associated service provider nodes (4c) via a fourth communication network; credit determined by the transmitted transaction data is reserved by associated service provider nodes (4c) for the second network subscriber nodes (2) and the reserved credit is confirmed by the associated service provider node (4c) to the third network subscriber nodes (3) via the fourth communication network; a transaction number is produced and is transmitted from the third network subscriber nodes (3) to the second terminal (1b) of the first network subscriber node (1) via the second communication network; the transmitted transaction number is inputted into the first terminal (1a) of the first network subscriber node (1) and the input transaction number is transmitted (S7', S8; S7) to the third network subscriber nodes (3) via the third communication network; the transmitted transaction number is verified by the third network subscriber nodes (3) by comparing the previously produced transaction number with the third network subscriber nodes; and the credit reserved by the associated service provider nodes (4c) is confirmed by the third network subscriber nodes (3) via the third communication network to the second network subscriber nodes (2).

20 Claims, 3 Drawing Sheets

METHOD FOR CARRYING OUT AN ELECTRONIC TRANSACTION

PRIOR ART

The present invention relates to a method for carrying out an electronic transaction.

Although they may be applied to any transactions or operations and networks, the present invention and its underlying problems are explained with reference to a payment operation on the Internet.

As is known, an Internet user frequently encounters the problem that he wishes to pay for a charging Internet page or goods and/or services from an Internet provider online without cash. For this, it is known practice to make electronic payments, particularly for sums of up to approximately EUR 10.00, on the Internet by credit card, by bank collection or prepaid cards using what are known as added-value service telephone numbers (0190, 0900, etc.). Although a certain minimum level of security can be ensured for this process by means of encryption methods, certification measures and revocation options at the bank, there nevertheless remains a residual risk of unwanted misuse of this payment option by criminal third parties. Almost all systems also require prior registration by the customer, which takes up several minutes of time. A very large number of purchasers quickly lose patience in doing this, since the effort is too great, particularly for small sums. They consider registration to be unnecessary, complicated, time-consuming and, furthermore, do not gladly wish to disclose their personal data. Many people therefore abort the registration process and thus lose interest in the provided services or products overall.

EP 0 875 871 A2 discloses a method for authorization in data transmission systems using a transaction number or a comparable password, where, in a first step, the user uses a data input unit to send his identification and/or an identification identifier for the data input unit together with the request for generation or selection of the transaction number or of the comparable password from a file to an authorization computer. In a second step, the authorization computer generates the transaction number or the comparable password or selects it from a file. In a third step, the authorization computer sends the transaction number or the comparable password to a receiver belonging to the user via a different transmission path than in the first step. In a fourth step, the user receives this transaction number and the comparable password from the receiver and inputs the password into the data input unit. In a fifth step, this transaction number or the comparable password is transmitted back to the authorization computer. In a sixth step, the authorization computer checks the validity of the transaction number and of the comparable password so as then, in a seventh step, to set up or clear a connection between the data input unit and a reception unit. In particular, this document teaches that the transaction number or comparable password can be used just once, and that the validity of the transaction number or of the comparable password is a predefined user time.

DE 100 45 924 A1 discloses a method for protecting a transaction on a computer network, in which a customer transmits personal data, including a name, an address, a mobile radio number and a credit card number, to a service provider which performs a customer check for a payment service provider. This method has the drawback that critical personal data need to be transmitted in order to permit the customer check.

DE 101 25 017 A1 discloses a method for providing services in a data transmission network in which an access function for a plurality of service use computers takes requests from one service use computer as a basis for permitting a connection between the service use computer and a service provision computer selected by a service user.

It is an object of the present invention to specify an improved method for carrying out an electronic transaction which allows the transaction to be carried out inexpensively, easily, quickly and largely anonymously.

ADVANTAGES OF THE INVENTION

The inventive method having the features of claim 1 or 2 is used for performing electronic transactions quickly, easily and securely. The transaction is performed in two phases, with the first phase involving authentication of the customer and reservation of a credit (e.g. purchase price+supplements), and with the second phase involving the credit being posted after the service has been provided. This ensures that no unauthorized or duplicate postings occur.

In particular, the inventive method allows a standard transaction process for a plurality of service providers. Access is connected to the transactions, and hence no permanent registration is necessary. As technical platforms for the inventive electronic transactions, e.g. commercial business and services (digital products, Web access, downloads, news services, subscription services, added-value services, memberships, e.g. for members' areas, online forums, any file downloads, such as music files, videos, PDF files etc., ringtones, logos, wallpapers, vouchers, erotic contents etc.), it is possible to use WAP, UMTS and other wireless and wired communication paths in addition to the Internet and the mobile radio network.

For the provider node there is the advantage that the associated service provider node can look after the billing, and for the service provider node there is the advantage that the coordinator node takes management complexity and functional complexity away from it.

In addition, there is no need for sensitive data, such as account numbers or credit card numbers, to be interchanged between the network subscriber nodes. The inputs for arranging, i.e. validating, the transaction between the first network subscriber node and the second network subscriber node can be reduced to a minimum. The data records transmitted are not suitable individually for misuse, and therefore the protective measures for the data records themselves can be kept at a low level. There is no need to use an independent certification point. The transaction costs are negligibly low, which makes the method suitable even for the smallest payments.

A particularly preferred refinement of the inventive method is provided by the first all-embracing online payment system with variable amounts under standard ordering process without signing on, registering or logging in via all registered network operators. The billing amounts are collected by the service provider with which the end customer is registered through the next monthly mobile radio invoice or by prepaid card. Authentication of the end customer is ensured through delivery of the transaction number by SMS. This online payment system appeals precisely to these customers, since no registration is necessary, and allows uncomplicated electronic payment, particularly of small sums of up to approximately EUR 10.00, through a simple, anonymous and rapid process. Other advantages are safe identification of the terminal through delivery of a PIN via a channel which is separate from the web, debiting of the amount only following a successful operation and when the service has been provided, no duplicate debiting when an incorrect PIN is sent, no debiting of the mobile radio account if the validity period of the PIN expires, no disclosure of personal data, no input of the credit card number, encrypted transmission of the mobile radio number on the Internet and the fact that the payment operation can be completed in a few minutes and the customer can use the services or products which have been paid for at short notice.

The subclaims contain advantageous developments and improvements of the respective subject matter of the invention.

In line with one preferred development, the following steps are performed conclusion of the transaction is confirmed by the second network subscriber node to the third network subscriber node via the third communication network; and conclusion of the transaction is confirmed by the third network subscriber node to the associated service provider node via the fourth communication network.

In line with one preferred development, the identification number and the transaction data are transmitted and/or the input transaction number is transmitted from the first network subscriber node to the third network subscriber node indirectly via the second network subscriber node.

In line with one preferred development, the identification number and the transaction data are transmitted and/or the input transaction number is transmitted from the first network subscriber node to the third network subscriber node directly. This has the additional advantage that the second network subscriber node does not receive the identification number or the transaction number, that is to say that anonymity is provided to a greater extent.

In line with another preferred development, the transaction data comprise a purchase price and a product specification.

In line with another preferred development, the second communication network is a mobile radio network or a landline telephone network, and the identification number is a mobile radio number or a landline telephone number.

In line with another preferred development, the first and/or third communication network(s) is/are the Internet.

In line with another preferred development, the fourth communication network is a landline telephone network.

In line with another preferred development, the transaction number has a one-off validity and/or a time limit for the validity.

In line with another preferred development, if the verification or the confirmation of the reservation or the verification of the transaction number fails then the third network subscriber node transmits an error message to the second network subscriber node via the third communication network.

In line with another preferred development, the verification and identification are performed by means of electronic comparison with a table file.

In line with another preferred development, if the confirmation does not occur within a prescribed period then the reserved credit is deleted.

In line with another preferred development, the reservation is made by debiting an account at the first network subscriber node, which account is managed by the associated service provider node.

In line with another preferred development, if the verification of the transaction number or the confirmation fails then the third network subscriber node transmits an error message to the associated service provider node to delete the reserved credit via the fourth communication network instead of the confirmation.

In line with another preferred development, the reservation is made on the basis of a credit rating check at the associated service provider node.

In line with another preferred development, if the verification and identification or the confirmation fail then the second network subscriber node asks the first network subscriber node for reinput a limited number of times from the third network subscriber node.

In line with another preferred development, the transaction number is transmitted by SMS.

In line with another preferred development, the first network subscriber node is an end customer node, the second network subscriber node is a provider node, the third network subscriber node is a coordinator node and the service provider node is a mobile radio provider node.

DRAWINGS

Exemplary embodiments of the invention are illustrated in the drawings and are explained in more detail in the description below.

DESCRIPTION OF THE EXEMPLARY EMBODIMENTS

In the figures, identical reference symbols denote components which are the same or have the same function.

Figure 1:
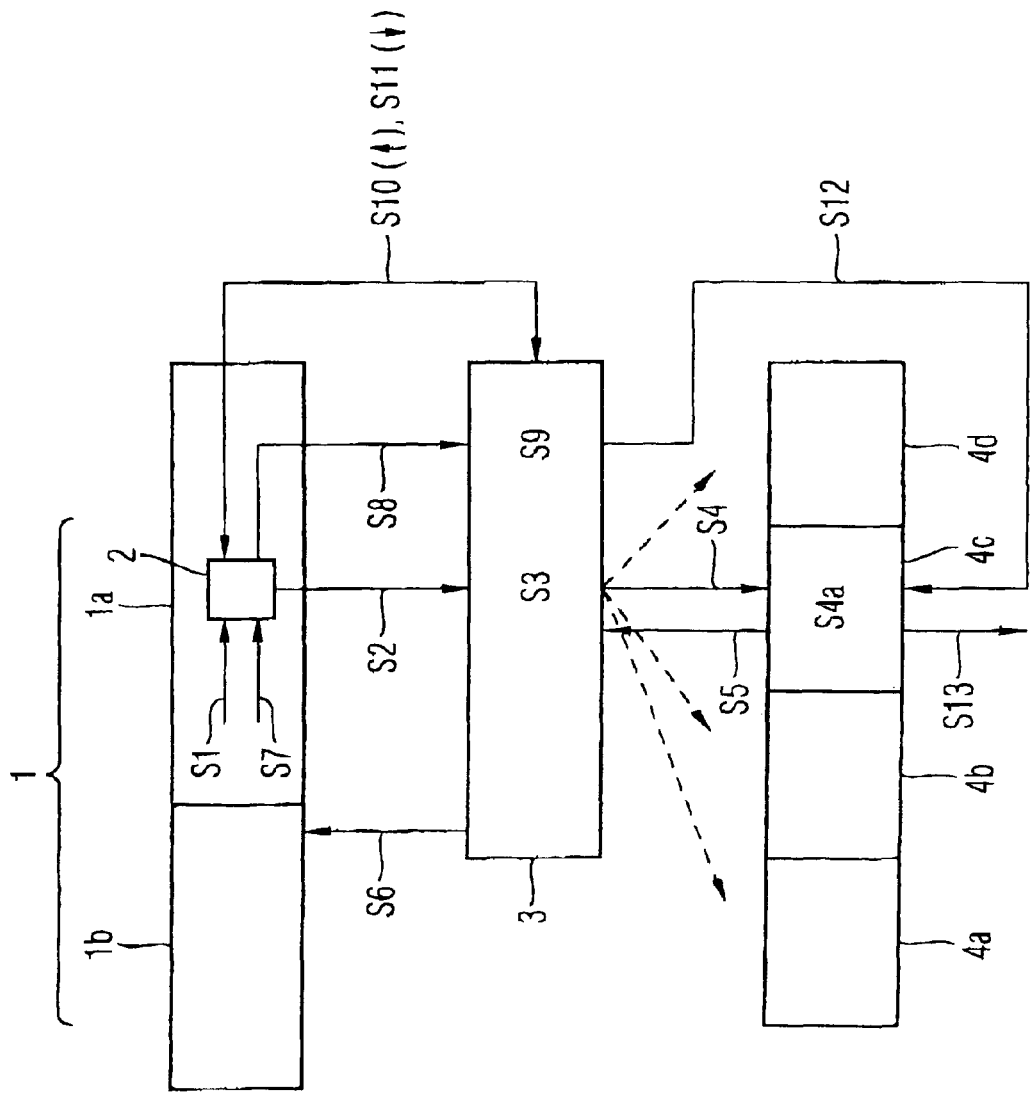
FIG. 1 shows a system diagram to illustrate a network subscriber node complex and the data to be interchanged in line with a first embodiment of the present invention.

FIG. 1 shows a system diagram to illustrate a network subscriber node complex and the data to be interchanged in line with a first embodiment of the present invention.

In FIG. 1, reference symbol 1 denotes a first network subscriber node, which is an end customer node in this exemplary embodiment. The first network subscriber node 1 has a first terminal 1a in the form of a home computer which is connected to a first communication network (in this case the Internet), and a second terminal 1b in the form of a mobile telephone which is connected to a second communication network, in this case a mobile radio network.

In step S1, the end customer using the first network subscriber node 1 uses the first terminal 1a in the form of the home computer to visit an Internet portal at a second network subscriber node 2, which in this embodiment is an Internet provider from which it is possible to obtain mobile phone logos, for example. In this Internet session, the first network subscriber node 1 uses its first terminal 1a to interchange data with the second network subscriber node 2 in order to pick a product in the form of a particular mobile phone logo, which has a purchase price of EUR 3.00, for example, as evidenced on the Internet page of the second network subscriber node 2.

When the relevant transaction data for this purchase transaction have been stipulated in this manner, e.g. purchase price, article name and order number, the user clicks on a "payment button" on the Internet page of the second network subscriber node 2 in step S1. The second network subscriber node 2 then asks the customer to input the mobile radio number (identification number) of the second terminal 1b. Inputting and transmitting this mobile radio number from the first network subscriber node 1 to the second network subscriber node 2 via the first communication network in the form of the Internet concludes step S1, i.e. the electronic payment operation (transaction) is initiated.

In a subsequent step S2, the second network subscriber node 2 in the form of the Internet provider transmits the input identification number, i.e. the mobile radio number, and the transaction data in the form of the product designation of the selected mobile phone logo and the purchase price to a third network subscriber node 3, which is a coordinator node, i.e. which coordinates electronic payment operations for a plurality of Internet providers. In the present case, the transmission is performed via a third communication network, likewise the Internet, in step S2.

In step S3, the third network subscriber node 3 verifies the transmitted mobile radio number and identifies an associated service provider node 4c from a plurality of service provider nodes 4a, 4b, 4c, 4d which are registered with it. In the present example, the service provider nodes are mobile radio provider nodes, e.g. X1 (4a), X2 (4b), X3 (4c), X4 (4d). The verification and identification in step S3 are expediently performed by means of an electronic table file.

In the case of successful verification and identification in step S3, in this case of the association with the X3 service provider node 4c, the third network subscriber node 3 in the form of the coordinator node turns to the ascertained service provider node 4c, as described further below. If the verification and identification in step S3 fail, the third network subscriber node 3 sends an appropriate error message to the second network subscriber node 2, and the second network subscriber node then terminates the electronic payment operation and sends an appropriate message to the first subscriber node 1 via the Internet. This message may represent final termination, for example, or may be a request for fresh input of a valid mobile radio number. It would likewise be conceivable for the mobile radio number which has been input by the first network subscriber node 1 and has been transmitted from the second network subscriber node 2 to the third network subscriber node 3 to belong to a service provider node which is not registered with the third network subscriber node 3. In this case too, an appropriate error message would be generated, because although the mobile radio number is valid it cannot be coordinated by the third network subscriber node 3.

In the case of successful verification and identification in step S3, the third network subscriber forwards the data via a fourth communication network, e.g. a wired leased line, to the identified associated service provider node 4c in step S4. The associated service provider node 4c then checks the mobile radio number for validity and the prepaid account of the first network subscriber 1 registered with it for its credit rating in line with predetermined criteria in step S4a. Should the prepaid account have the appropriate credit rating, the associated service provider 4c reserves a credit corresponding to the transmitted purchase price plus appropriate supplements from the third network subscriber node 3 and from the service provider node 4c in favor of the second network subscriber node 2 and by debiting the first network subscriber node 1 registered with it, and confirms the reservation in step S5 to the third network subscriber node 3 via the fourth communication network in the form of the leased line. Otherwise, an appropriate error message can be sent to the third network subscriber node 3 via the fourth communication network, and the network subscriber node 3 in turn sends this error message to the second network subscriber node 2, which then terminates the electronic payment operation and sends an appropriate message to the first subscriber node 1 via the Internet.

In step S6, the third network subscriber node 3 generates a once-valid transaction number with a time limit of 30 minutes, for example, following the positive confirmation in step S5 and transmits this transaction number via the second communication network in the form of the mobile radio network of the service provider node 4c to the second terminal 1b in the form of the mobile radio telephone at the first network subscriber node 1, specifically in the form of an SMS (Short Message Service) message.

Following receipt of the transaction number in the SMS message, the user of the first network subscriber node 1 inputs the transmitted transaction number into the first terminal 1a in step S7, for example using the keyboard belonging to the home computer, and transmits this transaction number via the first communication network in the form of the Internet to the second network subscriber node 2.

In step S8, the second subscriber node 2 sends the transaction number transmitted by the first subscriber node 1 to the third network subscriber node 3 via the third communication network. The transaction number transmitted to the third network subscriber 3 from the second network subscriber 2 in this way is verified by electronic comparison with the transaction number which was generated previously by the third network subscriber node 3 and stored in the meantime.

If step S9 fails as a result of transmission of an incorrect transaction number in step S8 or S7 or if the time limit set expires then an error message is sent to the second network subscriber node 2 and to the relevant service provider node 4c.

If the verification in step S9 is successful then the third network subscriber 3 confirms the credit reserved by the associated service provider node 4c to the second network subscriber node 2 and thus enables continuation of the transaction in step S10 via the third communication network. The product in the form of the mobile phone logo which was ordered can then be delivered from the second network subscriber node 2 to the first network subscriber node 1, for example by e-mail or by SMS message or by mail.

Following delivery, the second network subscriber node 2 confirms conclusion of the transaction to the third network subscriber node 3 via the third communication network in step S11, and the third network subscriber node 3 then confirms conclusion of the transaction to the associated service provider node 4c by the fourth communication network.

Finally, in step S13, the credit from the second network subscriber node 2, which credit was reserved in the account of the first network subscriber 1 for the purchase price plus supplements, is invoiced to the first network subscriber node 1 by means of a later mobile radio invoice or prepaid card.

In the present embodiment, the claim from the second network subscriber node 2 to the third network subscriber node 3 is ceded in return for payment of the purchase price. The claim from the third network subscriber node 3 to the service provider node 4c is then ceded in return for payment of the purchase price plus a first supplement. The second subscriber node 2 therefore remains anonymous to the service provider node 4c.

Figure 2:
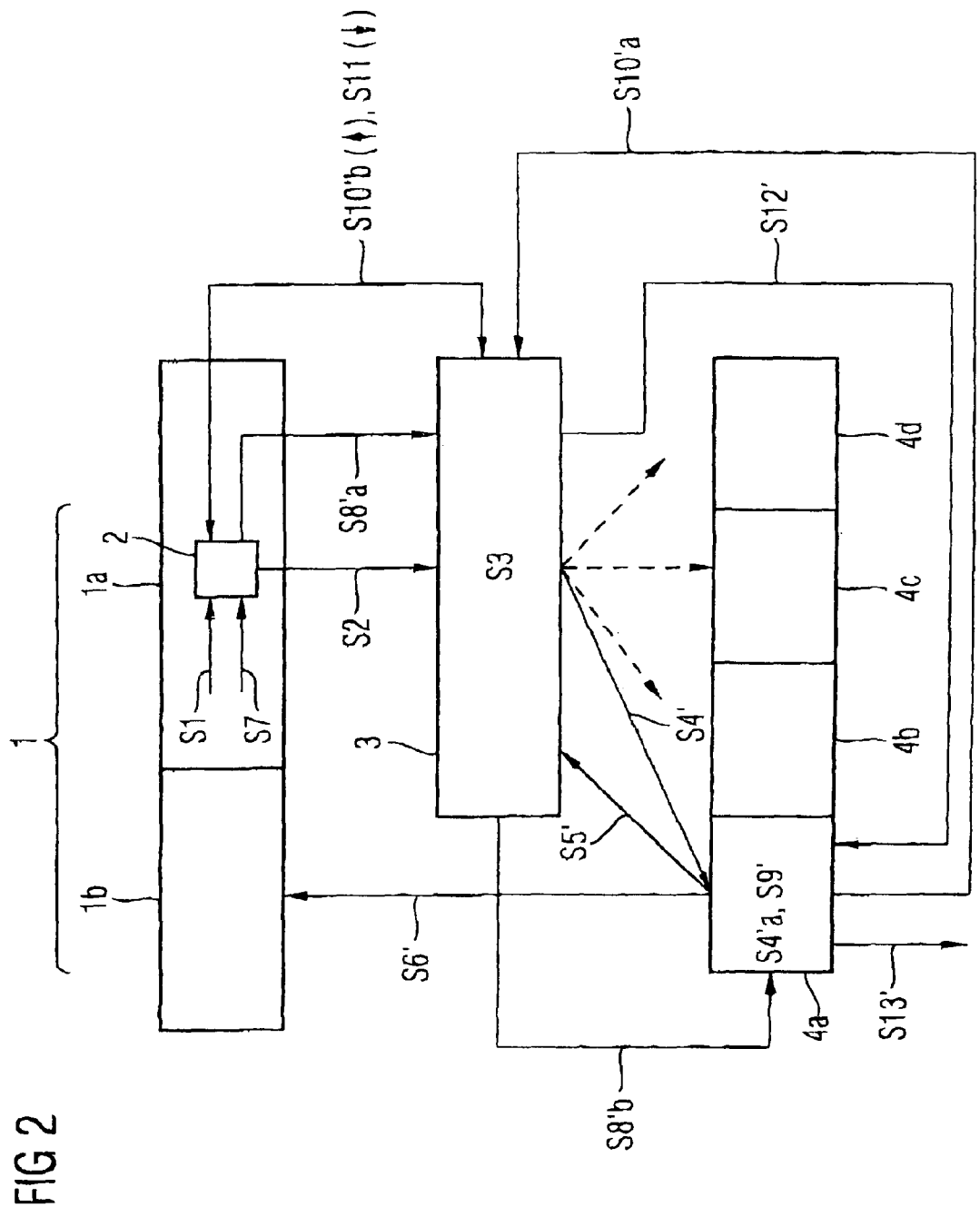
FIG. 2 shows a system diagram to illustrate a network subscriber node complex and the data to be interchanged in line with a second embodiment of the present invention.

FIG. 2 shows a system diagram to illustrate a network subscriber node complex and the data to be interchanged in line with a second embodiment of the present invention.

In the second embodiment in FIG. 2, the system design and the networking correspond to those in the first embodiment shown in FIG. 1. Steps S1, S2 and S3 are also carried out in the same way.

Unlike in the first embodiment, the second network subscriber node 2 in the second embodiment identifies the X1 service provider node 4a as associated service provider node and transmits the verified identification number and the transaction data to the service provider node 4a via the fourth communication network in the form of the leased line in step S4'.

Following the check on the validity and the credit rating of the prepaid account of the first network subscriber 1 at the service provider node 4a, the credit is reserved in step S4'a in favor of the second network subscriber node and by debiting the first network subscriber node. If reservation is successful, it is transmitted to the third network subscriber node 3 via the fourth communication network in step S5.

Unlike in the first embodiment explained above, the associated service provider node 4a in the present exemplary embodiment generates the transaction number in step S6' itself, however, and transmits it to the second terminal 1b in the form of the mobile telephone at the first network subscriber node via the second communication network—the mobile radio network corresponding to the first service provider node 4a.

In a similar manner to the first embodiment, step S7 is then carried out, inputting the transmitted transaction number into the first terminal 1a at the first network subscriber node 1 and transmitting the input transaction number to the second network subscriber node 2 via the first communication network. In addition, the transmitted transaction number is forwarded from the second network subscriber node 2 to the third network subscriber node 3 via the third communication network in step S8'a.

However, the third network subscriber node 3 in this exemplary embodiment does not verify the transmitted transaction number, since it does not know it or has not generated it, but rather merely forwards it via the fourth communication network to the associated service provider node 4a in step S8'b.

In this exemplary embodiment, the transmitted transaction number is verified by the associated service provider node 4a by comparing it with the transaction number which it generated previously.

In the case of successful verification, the verified transaction number is confirmed in step S10'a to the third network subscriber node 3 in step S10'a, and, in step S10'b, the third network subscriber node 3 sends confirmation to the second network subscriber node 2 in similar fashion to step S10 in the above embodiment.

When the confirmation has been received in step S10'b, the transaction operation is continued by the second subscriber node, namely delivery of the ordered mobile phone logo to the first network subscriber node 1.

In similar fashion to the first embodiment, the confirmation from the second network subscriber node 2 is then sent to the third network subscriber node 3 regarding delivery in step S11, and the confirmation of conclusion of the transaction is sent from the third network subscriber node 3 to the associated service provider node 4a in step S12'.

Finally, as in the first embodiment, the amount credited to the second network subscriber node 2 by debiting the first network subscriber node 1 is debited from the first network subscriber node 1 in a mobile radio invoice or a prepaid card in step S13'.

Figure 3:
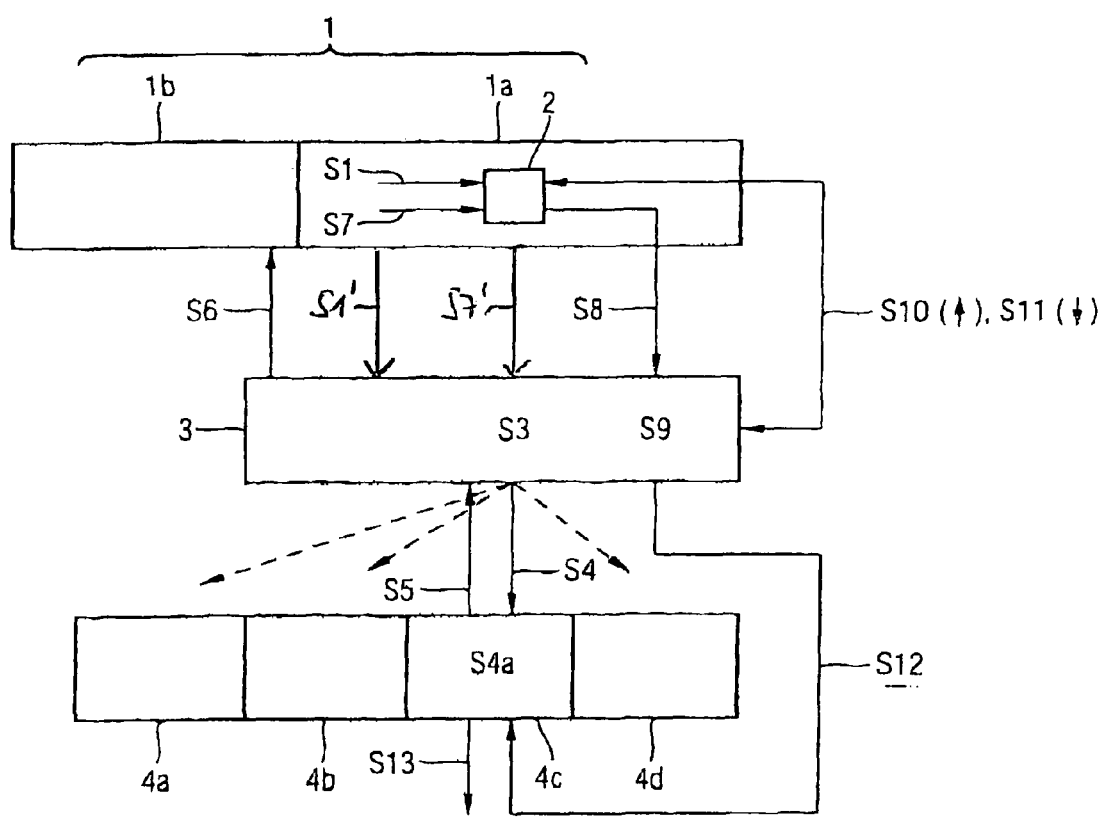
FIG. 3 shows a system diagram to illustrate a network subscriber node complex and the data to be interchanged in line with a third embodiment of the present invention.

In the second embodiment too, the claim from the second network subscriber node 2 to the third network subscriber node 3 is ceded in return for payment of the purchase price. The claim from the third network subscriber node 3 to the service provider node 4c is then ceded in return for payment of the purchase price plus a first supplement FIG. 3 shows a system diagram to illustrate a network subscriber node complex and the data to be interchanged in line with a third embodiment of the present invention.

In the third embodiment, unlike in the first embodiment, the identification number and the transaction data are transmitted from the first network subscriber node 1 to the third network subscriber node 3 in step S1', and also the input transaction number is transmitted from the first network subscriber node 1 to the third network subscriber node 3 directly without interposition of the second network subscriber node.

When the relevant transaction data for the purchase transaction have been stipulated, e.g. purchase price, article name and order number, the user clicks on a "payment button" on the Internet page of the second network subscriber node 2 in step S1, and this opens an Internet page mask from the third network subscriber node 3 to which the transaction data have already been transferred and which asks the first network subscriber node 1 to input the mobile radio number (identification number) of the second terminal 1b into the first terminal. Inputting and transmitting this mobile radio number and the transaction data from the first network subscriber node 1 to the third network subscriber node 3 via the first communication network in the form of the Internet concludes step S1', i.e. the electronic payment operation (transaction) is initiated.

Similarly, in step S7' a request for input of the previously transmitted transaction number into the Internet page mask of the third network subscriber node 3 is made and then this transaction number is transmitted via the first communication network in the form of the Internet, which concludes step S7'.

Otherwise, the first and third embodiments concur.

Although the present invention has been described above with reference to preferred exemplary embodiments, it is not limited thereto but rather can be modified in a wide variety of ways.

Although the electronic communication networks in the examples above are the Internet and mobile radio networks, the invention can naturally be applied to any desired wired or wireless electronic communication network. In particular, it is also not absolutely necessary to have a point-to-point connection between the network subscriber nodes, but rather any physical connection is possible. In addition, the term data record is intended to be understood generally, i.e. as data labeled as belonging to any ordinal model. In addition, the invention is naturally not limited to payment operations, but rather can be applied to any transactions, i.e. operations.

The transmission of the identification number and the transaction data and/or the transmission of the input transaction number from the first network subscriber node to the third network subscriber node can naturally be effected directly in the second embodiment too, and not just indirectly by the second network subscriber node.

Method for Carrying Out an Electronic Transaction

| LIST OF REFERENCE SYMBOLS | |
|---|---|
| 1 | First network subscriber node, end customer |
| 1a | Computer |
| 1b | Mobile telephone |
| 2 | Second network subscriber node, provider |
| 3 | Third network subscriber node, coordinator |
| 4a-d | Service provider node, mobile radio provider |

The invention claimed is:

1. A computer-implemented method for conducting electronic transactions, comprising:
   receiving, by a network subscriber node computing device, an identification number and transaction data in connection with a telephone of a customer and regarding a desired electronic transaction to be completed between the customer and a transaction service provider, the identification number identifying the telephone, and the transaction data comprising information related to the desired electronic transaction;

verifying, by the network subscriber node computing device, a validity of the identification number;

identifying, by the network subscriber node computing device, an associated telephone service provider node computing device from a plurality of telephone service provider node computing devices registered with the network subscriber node computing device using the identification number, the telephone service provider node computing device operated by or on behalf of a telephone service provider associated with the customer;

transmitting, by the network subscriber node computing device, the verified identification number and the transaction data from the network subscriber node computing device to the associated telephone service provider node computing device;

receiving, at the network subscriber node computing device, a continuation that a credit has been reserved by the telephone service provider node computing device;

receiving, by the network subscriber node computing device, the confirmation that the credit has been reserved;

generating, by the network subscriber node computing device, a transaction number;

transmitting, by the network subscriber node computing device, the generated transaction number from the network subscriber node computing device to the telephone of the customer;

receiving, by the network subscriber node computing device, an input transaction number from a computer terminal of the customer, the computer terminal being different than the telephone of the customer;

verifying, by the network subscriber node computing device, the input transaction number by the network subscriber node computing device by comparing the input transaction number with the generated transaction number;

confirming, by the network subscriber node computing device, the credit reserved by the telephone;

receiving, by the network subscriber node computing device, a confirmation that the desired electronic transaction has been completed;

confirming, by the network subscriber node computing device to the telephone service provider node computing device, that the desired electronic transaction has been completed; and authorizing, by the network subscriber node computing device, the reserved credit.

2. The computer-implemented method of claim 1, wherein at least one of the identification number, the transaction data, and the input transaction number is transmitted from the customer to the network subscriber node indirectly via the transaction service provider.

3. The computer-implemented method of claim 1, wherein at least one of the identification number, the transaction data, and the input transaction number is transmitted from the customer to the network subscriber node directly.

4. The computer-implemented method of claim 1, wherein the transaction data comprises at least one of a purchase price and a product specification.

5. The computer-implemented method of claim 1, wherein the telephone comprises one of a mobile telephone and a landline telephone.

6. The computer-implemented method of claim 1, wherein the customer provides the input transaction number at the computer terminal, via the Internet.

7. The computer-implemented method of claim 1, wherein the step of continuing to the telephone service provider node computing device that the desired electronic transaction has been completed network comprises sending continuation to the telephone service provider node via a landline telephone network.

8. The computer-implemented method of claim 1, wherein the transaction number comprises one of a one-off valid transaction number and a transaction number with a time limit for validity.

9. The computer-implemented method of claim 1, wherein the network subscriber node computing device transmits an error message to the transaction service provider in response to one of (a) a failure of the verification of the input transaction number by the network subscriber node computing device and (b) a failure of the confirmation of the credit reserved by the associated telephone service provider node computing device by the network subscriber node computing device.

10. The computer-implemented method of claim 1, wherein verifying the validity of the identification number and identifying the associated telephone service provider node computing device comprises the step of completing an electronic comparison with a table file.

11. The computer-implemented method of claim 1, wherein, if the credit is not confirmed within a prescribed period, then the reserved credit is deleted.

12. The computer-implemented method of claim 1, wherein the network subscriber node transmits an error message to the associated telephone service provider node computing device to delete the reserved credit in response to an unsuccessful verification of the input transaction number.

13. The computer-implemented method of claim 1, wherein the credit is reserved a credit rating check at the associated telephone service provider node computing device.

14. The computer-implemented method of claim 1, wherein the transaction service provider prompts the customer for re-input of the input transaction number in response to a failure of the verification of the input transaction number by the network subscriber node computing device.

15. The computer-implemented method of claim 2, wherein the generated transaction number is transmitted by the network subscriber node computing device via short message service.

16. A computer program product, comprising:
a non-transitory computer-readable medium having computer-readable program instructions embodied therein that when executed by a computer cause the computer to perform electronic transactions comprising the steps of:
receiving an identification number and transaction data in connection with a telephone of a customer and regarding a desired electronic transaction to be completed between the customer and a transaction service provider, the identification number identifying the telephone, and the transaction data comprising information related to the desired electronic transaction;
verifying a validity of the identification number;
identifying an associated telephone service provider node from a plurality of telephone service provider nodes registered with a network subscriber node using the identification number, the telephone service provider node operated by or on behalf of a telephone service provider associated with the customer;

transmitting the verified identification number and the transaction data from the network subscriber node to the associated telephone service provider node;
receiving a continuation that a credit has been reserved by the telephone service provider node;
receiving the confirmation that the credit has been reserved;
generating a transaction number;
transmitting the generated transaction number from the network subscriber node to the telephone of the customer;
receiving an input transaction number from a computer terminal of the customer, the computer terminal being different than the telephone of the customer;
verifying the input transaction number by the network subscriber node by comparing the input transaction number with the generated transaction number;
confirming the credit reserved by the telephone;
receiving a confirmation that the desired electronic transaction has been completed;
confirming that the desired electronic transaction has been completed; and
authorizing the reserved credit.

17. The computer program product of claim 16, wherein at least one of the identification number, the transaction data, and the input transaction number is transmitted from the customer to the network subscriber node indirectly via the transaction service provider.

18. The computer program product of claim 16, wherein at least one of the identification number, the transaction data, and the input transaction number is transmitted from the customer to the network subscriber node directly.

19. A system for conducting electronic transaction, the system comprising:
a processor; and
a storage memory storing executable instructions that when executed by the processor cause the processor to perform the steps of:
receiving an identification number and transaction data in connection with a telephone of a customer and regarding a desired electronic transaction to be completed between the customer and a transaction service provider, the identification number identifying the telephone, and the transaction data comprising information related to the desired electronic transaction;
verifying a validity of the identification number;
identifying an associated telephone service provider node from a plurality of telephone service provider nodes registered with a network subscriber node using the identification number, the telephone service provider node operated by or on behalf of a telephone service provider associated with the customer;
transmitting the verified identification number and the transaction data from the network subscriber node to the associated telephone service provider node;
receiving a continuation that a credit has been reserved by the telephone service provider node;
receiving the confirmation that the credit has been reserved;
generating a transaction number;
transmitting the generated transaction number from the network subscriber node to the telephone of the customer;
receiving an input transaction number that has been provided by the customer at a computer terminal of the customer, the computer terminal being different than the telephone of the customer;
verifying the input transaction number by the network subscriber node by comparing the input transaction number with the generated transaction number;
confirming the credit reserved by the telephone;
receiving a confirmation that the desired electronic transaction has been completed;
confirming that the desired electronic transaction has been completed; and
authorizing the reserved credit.

20. The system of claim 19, wherein at least one of the identification number, the transaction data, and the input transaction number is transmitted from the customer to the network subscriber node indirectly via the transaction service provider.

* * * * *

UNITED STATES PATENT AND TRADEMARK OFFICE
CERTIFICATE OF CORRECTION

PATENT NO. : 8,756,162 B2
APPLICATION NO. : 10/572345
DATED : June 17, 2014
INVENTOR(S) : Ulrich Brunet et al.

Page 1 of 1

It is certified that error appears in the above-identified patent and that said Letters Patent is hereby corrected as shown below:

On the Title Page item (30) Foreign Application Priority Data; should read as follows:

Foreign Application number -- 103 43 566.2

Signed and Sealed this
Third Day of March, 2015

Michelle K. Lee
*Deputy Director of the United States Patent and Trademark Office*